US007936718B2

(12) United States Patent
Daley et al.

(10) Patent No.: US 7,936,718 B2
(45) Date of Patent: May 3, 2011

(54) SYSTEM AND METHOD FOR FRAME SELECTION IN IP-BASED CDMA NETWORK

(75) Inventors: Robert S. Daley, Del Mar, CA (US); Dan Vassilovski, Del Mar, CA (US); Maria I. Marshall-Wilson, Oceasnside, CA (US)

(73) Assignee: QUALCOMM Incorporated, San Diego, CA (US)

(*) Notice: Subject to any disclaimer, the term of this patent is extended or adjusted under 35 U.S.C. 154(b) by 687 days.

(21) Appl. No.: 11/064,540

(22) Filed: Feb. 23, 2005

(65) Prior Publication Data

US 2005/0201329 A1 Sep. 15, 2005

Related U.S. Application Data

(63) Continuation-in-part of application No. 09/916,047, filed on Jul. 25, 2001, now abandoned.

(51) Int. Cl.
*H04W 4/00* (2009.01)

(52) U.S. Cl. ........ 370/331; 370/479; 370/463; 370/465; 370/466; 370/467; 370/468; 370/469

(58) Field of Classification Search .................. 370/342, 370/441, 479, 331, 463, 465–469; 455/436, 455/439, 442

See application file for complete search history.

(56) References Cited

U.S. PATENT DOCUMENTS 5,991,626 A * 11/1999 Hinz et al. .................... 455/436
6,141,559 A * 10/2000 Neumiller et al. ............ 455/525
6,252,862 B1 * 6/2001 Sauer et al. ................... 370/331
6,507,572 B1 * 1/2003 Kumar et al. ................. 370/335
6,542,744 B1 * 4/2003 Lin .............................. 455/437
6,940,845 B2 9/2005 Benveniste
6,950,657 B1 * 9/2005 Hiller et al. .................. 455/445
6,954,641 B2 * 10/2005 McKenna et al. .......... 455/435.1
6,961,573 B1 * 11/2005 Moon et al. .................. 455/445
6,999,434 B1 * 2/2006 Agrawal et al. ............... 370/331
7,499,437 B2 * 3/2009 Das et al. ...................... 370/338
7,843,882 B2 * 11/2010 Samuel et al. ................ 370/331
2001/0001268 A1 5/2001 Menon et al.
2002/0045424 A1 * 4/2002 Lee ................................ 455/41
2002/0093931 A1 * 7/2002 Dalal ............................ 370/342
2004/0102227 A1 * 5/2004 Schlegel .................... 455/569.1
2004/0196808 A1 * 10/2004 Chaskar et al. ............... 370/331
2007/0135187 A1 * 6/2007 Kreiner et al. ............ 455/575.2
2007/0184857 A1 * 8/2007 Pollock et al. ................ 455/466
2008/0132220 A1 * 6/2008 Fitzgibbon .................... 455/420

OTHER PUBLICATIONS

Interantional Search Authority-PCT/US02/023915, International Search Authority-ISA/US-11-12-02.
International Preliminary Examination Report-PCT/YS02/023915, International Search Authority-IPEA/US-04-02-04.

* cited by examiner

*Primary Examiner* — Charles N Appiah
*Assistant Examiner* — Kwasi Karikari
(74) *Attorney, Agent, or Firm* — Raphael Freiwirth

(57) ABSTRACT

A wireless telephone without IP capability nonetheless communicates with an infrastructure that uses IP. Virtual IP endpoints, such as Base Stations (BTS), not only communicate with the infrastructure using IP and with the telephone using over-the-air protocol, such as Code Division Multiple Access (CDMA), but one of the endpoints also selects the best frame over a call received by multiple endpoints, alleviating the need for a Base Station Controller (BSC) in the infrastructure. A handoff assist entity causes frame selection to be transferred to a second BTS in accordance with a handoff algorithm.

29 Claims, 4 Drawing Sheets

SYSTEM AND METHOD FOR FRAME SELECTION IN IP-BASED CDMA NETWORK

CLAIM OF PRIORITY UNDER 35 U.S.C. §120

The present Application for Patent is a Continuation in Part and claims priority to patent application Ser. No. 09/916,047 entitled "System and Method for Frame Selection in IP Based CDMA Network" filed Jul. 25, 2001 now abandoned, and assigned to the assignee hereof and hereby expressly incorporated by reference herein.

BACKGROUND

1. Field

The present disclosure relates generally to enabling a wireless device that is not required or generally configured to support Voice over Internet Protocols (VoIP) to nonetheless communicate with a wireless infrastructure that uses Internet Protocol (IP) structures or architectures, with IP-based communication between the wireless infrastructure and any VoIP-based infrastructure being supported.

2. Background

Wireless devices, such as but not limited to wireless telephones that communicate using Code Division Multiple Access (CDMA) spread spectrum modulation techniques, communicate over the air with system infrastructure using wireless telephone over-the-air communication protocols, e.g., the CDMA protocols known as IS-95A, IS-95B, and IS-2000. The system infrastructure, which can include Base Stations (BTS), Base Station Controllers (BSC), and other components, connects the wireless device to another communication device, such as a through land line or another wireless communication system.

In the case of CDMA, voice data is sent over the air in packets that are collected by the infrastructure and assembled into a voice stream, transparently to the speakers who are talking to each other. As might be expected, the over-the-air protocol is tailored to optimize wireless communication. For instance, to maximize over-the-air capacity, the over-the-air protocol contains a minimum of signaling information, and the size of a voice data packet is relatively small.

With the growth of the Internet, computer-to-computer communication using IP has become ubiquitous. Furthermore, it has become desirable not only to facilitate computer data communication using IP, but to facilitate voice communication using IP as well. As but one advantage afforded by using IP in a telephony infrastructure, much hardware such as switches can be eliminated, and existing computers and software can be used instead, reducing cost. To this end, so-called VoIP has been introduced.

To support VoIP, a communication device must have, among other requirements, IP capability, i.e., the device must itself be able to communicate using IP, and it must have an IP address. However, requiring a wireless telephone to use VoIP diminishes over-the-air capacity because VoIP is not necessarily designed to maximize such capacity. Instead, VoIP accounts for design considerations that are not necessarily related to wireless telephony. As an example, the data packet size of VoIP is relatively large, compared to the packet size used throughout the wireless communication industry such as in wireless telephones using over-the-air protocols such as IS-95. Indeed, a typical packet size in the IS-95 protocol is less than the size of a single packet header employed in a typical IP. Moreover, configuring a wireless telephone to communicate using both IP and over-the-air protocols complicates telephone design, adversely strains available resources (e.g., power, computing cycles, coding, and so on), and increases costs.

Nonetheless, it would be desirable to enable wireless telephone communication using an infrastructure that transmits data in accordance with IP principles. With the above considerations in mind, the present disclosure provides several solutions.

SUMMARY

A communications system is disclosed. The communications system includes a plurality of access points, and a wireless communication device configured to transmit frames of information to the access points, wherein a first one of the access points is configured to perform a frame selection function between the frames received by the access points from the wireless communications devices, and handoff the frame selection function to a second one of the access points.

A method of communications is disclosed. The method includes receiving frames of information from a wireless communications device at each of a plurality of access points, performing, at a first one of the access points, a frame selection function between the frames received by the access points from the wireless communications devices, and handing off the frame selection function to a second one of the access points.

An access point is disclosed. The access point includes a transceiver configured to receive frames of information from a wireless communications device, and a processor configured to communicate with a remote access point, the processor being configured to perform a frame selection function between the frames received by the transceiver, and frames received from the wireless communications device through the remote access point, the processor being further configured to handoff the frame selection function to the remote access point.

A VoIP system is disclosed. The VoIP system includes a plurality of access points communicating with a plurality of wireless communication devices using an over-the-air protocol different from IP, each of the wireless communication devices transmitting frames of information, at least a first one of the access points undertaking selection functionality including frame selection and handoff control, and wherein the selection functionality is undertaken for at least one of the communication devices, and at least a second one of the access points assumes frame selection for said at least one of the communication devices when a predetermined threshold is reached.

BRIEF DESCRIPTION OF THE DRAWINGS

The details of the present disclosure, both as to its structure and operation, can best be understood in reference to the accompanying drawings, in which like reference numerals refer to like parts, and in which.

DETAILED DESCRIPTION

Figure 1:
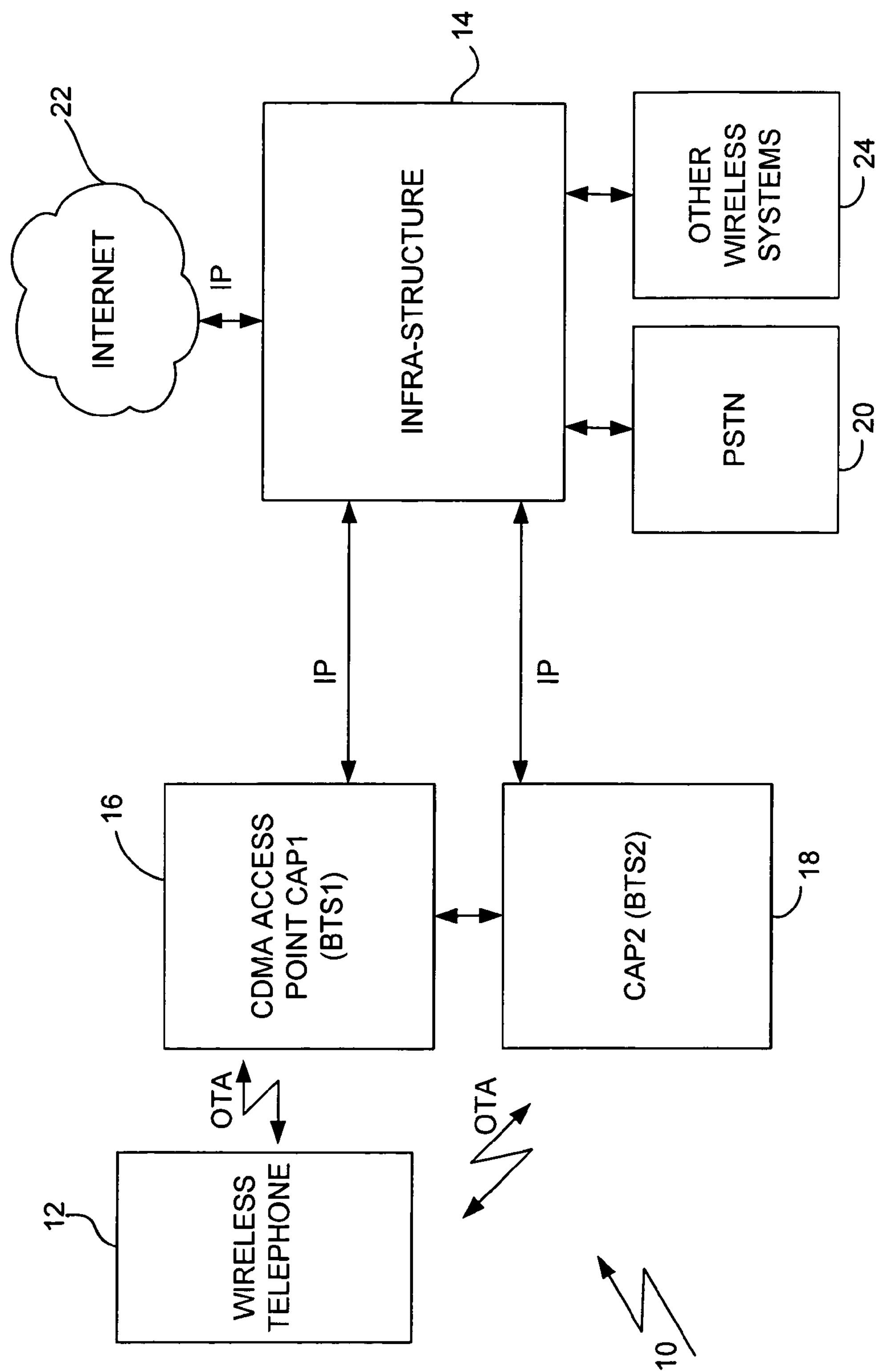
FIG. 1 is a block diagram of one implementation of the wireless communications system.

Referring initially to FIG. 1, a system is shown, generally designated 10, for effecting communication between a target wireless communication device 12 such as but not limited to a telephone that does not support IP and a telephony infrastructure 14 that does support IP. By "does not support VoIP" or "does not support IP" is meant that the wireless device 12 either has no IP or VoIP capability, or that it has such capability but for improved performance uses a standard Over-The-Air (OTA) protocol such as a spread spectrum scheme like CDMA or Wideband CDMA (WCDMA) or other wireless protocol such as but not limited to Time Division Multiple Access (TDMA), Universal Mobile Telecommunications System (UMTS), Time Division Synchronous Code Division Multiple Access (TD-SCDMA), etc. to communicate with the infrastructure 14.

In one non-limiting embodiment, the wireless device 12 is a mobile telephone made by Kyocera, Samsung, or other manufacturer that uses CDMA principles and CDMA OTA communication air interface and includes protocols such as defined in but not limited IS-95A, IS-95B, WCDMA, IS-2000, and others to communicate with the infrastructure 14.

Examples of wireless communication systems include Personal Communications Service (PCS) and cellular systems, such as Analog Advanced Mobile Phone System (AAMPS) and the following digital systems: CDMA, TDMA, and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TLA/EIA Standard IS-98. Other communications systems are described in the International Mobile Telecommunications System 2000/Universal Mobile Telecommunications Systems (IMT-2000/UM), standards covering what are referred to as WCDMA, cdma2000 (such as cdma2000 1× or 3× standards, for example) or TD-SCDMA.

The various concepts described throughout this disclosure apply to any wireless device 12; for illustration it will be assumed that the wireless device 12 is a telephone. In general, wireless devices may include but are not limited to a wireless handset or telephone, a cellular phone, a data transceiver, or a paging and position determination receiver, and can be handheld, or portable as in vehicle-mounted (including cars, trucks, boats, planes, trains), as desired. However, while wireless devices are generally viewed as being mobile, it is to be understood that the concepts described herein can be applied to "fixed" units in some implementations. Also, the present disclosure applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radio telephones, wireless units, or simply as "users" and "mobiles" in some communication systems.

As shown in FIG. 1, the wireless device 12 communicates with at least one infrastructure component 16. The first infrastructure component 16 is a CDMA Access Point (CAP), and preferably is a BTS. As intended herein, the BTS does not communicate with a BSC that is external to the BTS, i.e., the infrastructure 14 does not contain a BSC. Less desirably, a BSC can be included in the infrastructure, but with the below disclosed frame selection function being undertaken by a BTS.

A second CAP 18 is also established by a BTS of the infrastructure 14. While for clarity of disclosure FIG. 1 shows only two CAPs 16, 18, it is to be understood that more than two CAPs can be incorporated into the system 10.

In at least one embodiment of the system 10, communication within the infrastructure 14 is via IP. The CAPs 16, 18, thus communicate with wireless device 12 using OTA protocol, preferably using CDMA, but communicate internally to the infrastructure 14 using IP, thereby relieving the wireless device 12 from having to support IP. Also, by using IP internally to the infrastructure 14 and OTA protocol to the wireless device 12, the advantages of using IP internal to the infrastructure 14 are realized, whereas the advantages of OTA protocol in wireless communication to the wireless device 12 are preserved to maximize the over-the-air capacity of the system 10. Accordingly, the CAPs 16, 18 can be thought of as virtual IP endpoints, with the actual communication endpoint being the wireless device 12.

FIG. 1 further shows that the target wireless device 12 can also communicate with communication devices outside the infrastructure 14. Specifically, the infrastructure 14 can include a VoIP gateway for communicating, in accordance with principles known in the art, with a Public Switch Telephone Network (PSTN) 20. The communication between the VoIP gateway and the PSTN 20 can be via a signaling protocol such as ISUP using a physical system such as SS7. In turn, the PSTN includes one or more landline devices such as telephones or modems, to complete the communication pathway between the target wireless device 12 and the landline devices.

Additionally, the target wireless device 12 can communicate with the Internet 22, including Internet-based communication devices such as Personal Computers (PC) or other computers, via the infrastructure 14. Still further, the infrastructure 14 can communicate with wireless telephone systems 24 that are outside the infrastructure 14. Communication between the infrastructure 14 and the other wireless/cellular systems 24 can be via IS-41 protocol or IP.

Figure 2:
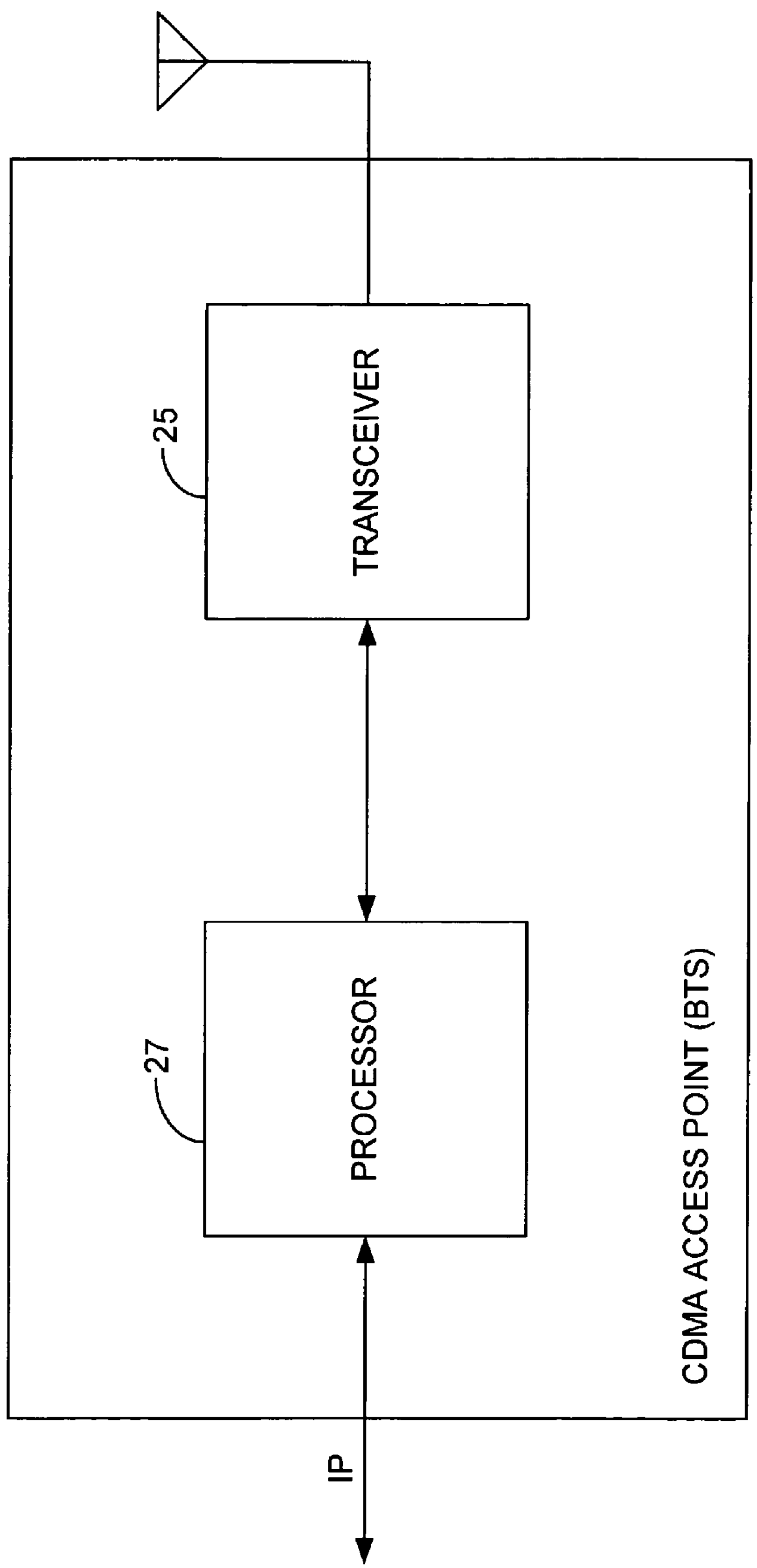
FIG. 2 is a block diagram of one implementation of an access point to a wireless communications system.

FIG. 2 is a conceptual block diagram illustrating an example of a CAP. In this configuration, the CAP includes a transceiver 25 capable of supporting communications with multiple wireless devices using an OTA protocol. A processor 27 may be used to provide various signal processing functions, such as modulation, spread-spectrum processing, and forward error correction. The processor 27 also performs a frame selection function and provides protocol conversion between the OTA interface and IP.

The processor 27 may be implemented as hardware, firmware, software, or any combination thereof. By way of example, the processor 27 may be implemented with a microprocessor, Digital Signal Processor (DSP), programmable logic, dedicated hardware or any other hardware, firmware and/or software based processing entity. In a microprocessor-based architecture, the frame selection function may reside in software that may be launched and executed when the need arises. The processor 27 will be described below in terms of its functionality, however, the manner in which it is implemented in practice will depend on the particular application and the design constraints imposed on the overall system. Those skilled in the art will recognize the interchangeability of hardware, firmware, and software configurations under these circumstances, and how best to implement the described functionality for each particular application.

Figure 3:
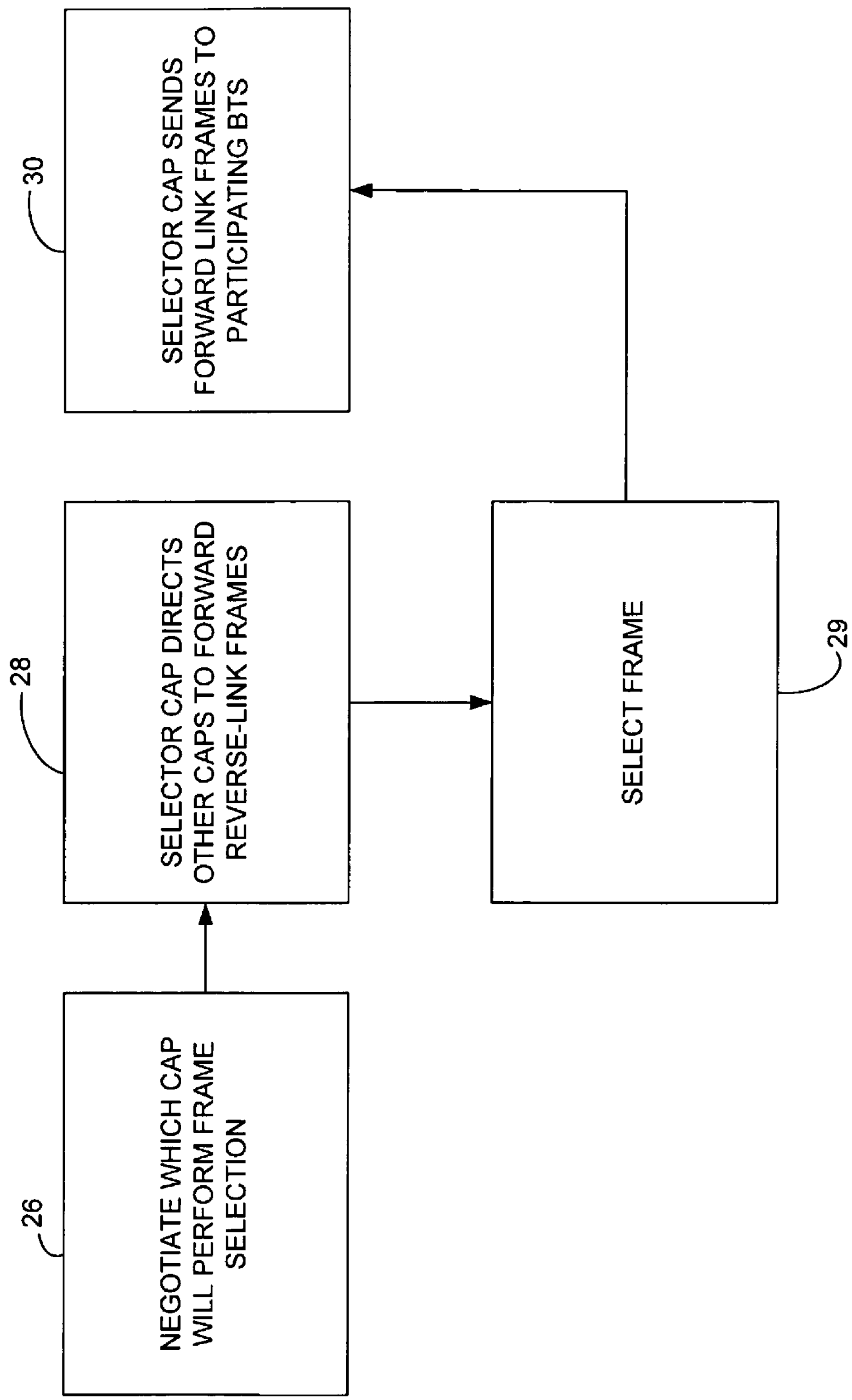
FIG. 3 is a flow chart of the logic for frame selection at one access points.

Now referring to FIG. 3, an example of the frame selection function is shown. Commencing at step 26, once communication using an appropriate OTA protocol is established between the wireless device 12 and the first CAP 16, i.e., between the wireless device 12 and the virtual IP endpoint, the CAPs 16, 18 negotiate among themselves or otherwise establish which CAP will initially function as the frame selector CAP. That is, the CAPs can determine which one will have frame selecting responsibility for the wireless device 12 when the wireless device 12 logs into the infrastructure 14. For instance, when the pilot signal is received from the wireless 12 by only a single CAP, that CAP assumes frame selection responsibility for the wireless device 12, and informs the infrastructure 14 of this. On the other hand, when two or more CAPs initially detect the wireless device 12, the CAPs can use a negotiation protocol to determine which CAP will undertake frame selection. In one non-limiting embodiment used for illustration, the negotiation protocol can include designating the CAP initially receiving the strongest pilot signal from the wireless device 12 as the frame selector for the telephone 12. Determining a frame selector CAP can thus be done dynamically as the telephone 12 logs into the infrastructure 14.

Proceeding to step 28, the selector CAP launches a frame selection application to support the call, and directs other CAPs in the infrastructure 14 to forward all reverse-link frames (i.e., frames representing information transmitted by the wireless device 12) to the selector CAP. At step 29, the selector CAP undertakes frame selection in accordance with frame selection principles known in the art to select the "best" frame from the various CAPs to be the frame for the call. Moreover, at step 30 the selector CAP sends forward link frames (i.e., frames intended for the wireless device 12) from the infrastructure 14 to all CAPs that are participating in the call, for transmission thereof to the wireless device 12.

In at least one IP implementation of the infrastructure 14, when communication is established, OTA packets such as OTA voice packets from the wireless device 12 are transformed or otherwise converted to IP at the virtual IP endpoints, i.e., at the CAPs 16, 18, etc. that are participating in the call. To make this transformation, the contents of the OTA voice packets are rearranged as appropriate to conform to IP packet requirements. The information in IP is sent through the infrastructure 14 toward the recipient.

Likewise, IP packets representing information intended for the wireless device 12 move through the infrastructure 14 and are converted to OTA packets by the virtual IP endpoints (CAPs). The OTA packets are sent to the wireless device 12. The transformation from IP to OTA protocol is the reverse of the process for converting OTA packets to IP packets, i.e., each IP packet might be separated into a set of smaller OTA packets as appropriate to conform to the OTA protocol used by the wireless device 12.

Figure 4:
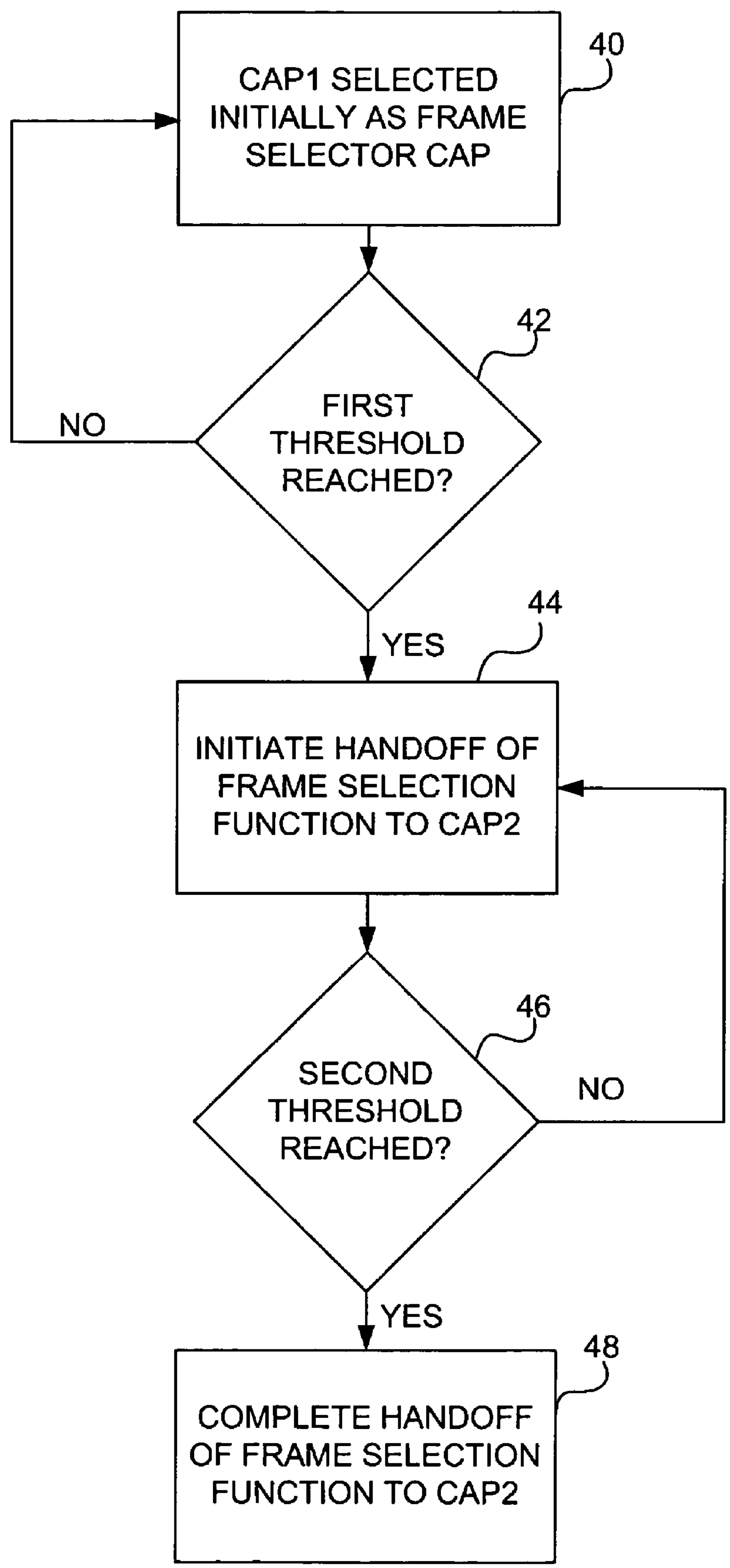
FIG. 4 is a flow chart of the logic for handing off frame selection between access points.

In some applications, it might be desirable to hand off the frame selection process between CAPs. In doing so, the process should be implemented in a manner that tends to reduce "dropped" calls as frame selection is handed off between CAPs. With these objectives in mind, attention is now drawn to the logic flow chart of FIG. 4.

Commencing at step 40, the first CAP 16 is initially selected as a frame selector CAP for the wireless device 12. The first CAP 16 can be the first BTS of the infrastructure 14 that detects the wireless device 12. The first CAP 16 enables a frame selection entity to support the call and directs all other CAPs in communication with the wireless device 12 to forward all reverse-link frames transmitted by the wireless device 12 to the selector CAP 16. In microprocessor based architectures, the frame selection entity may be application software that is launched and executed by the microprocessor. In any event, the selector CAP 16 performs frame selection in accordance with CDMA frame selection principles known in the art.

Moving to decision diamond 42, it is determined whether a soft handoff of the frame selection function should be initiated. Soft handoff is a process of establishing the frame selection function at the second CAP 18 before disengaging the frame selection function at the first CAP 16. Not only does this approach reduce the probability of dropped calls, but it also makes the handoff virtually undetectable to the user. The soft handoff may be initiated when a first threshold is reached. The first threshold may be any network parameter, and may vary from system to system depending on the specific application and overall design constraints.

In one embodiment, the first threshold may be based on the movement of a user on the wireless device 12 throughout the wireless coverage region. By way of example, as the user moves away from the first CAP 16, the second CAP 18 may begin to detect an increase in pilot signal strength from the wireless device. The second CAP 18 determines the signal strength of the pilot signal from the wireless device 12, and reports this information back to the first CAP 16. The first CAP 16 monitors this information and initiates a soft handoff of the frame selection function when the pilot signal strength of the wireless device measured at the second CAP 18 exceeds the pilot signal strength of the wireless device 12 measured at the first CAP by the first threshold.

In another embodiment, the first threshold may be based on the loading of the first CAP 16. (i.e., the number of calls it is supporting). As the traffic supported by the first CAP 16 increases, it may attempt to handoff one or more calls to another CAP with less traffic. Assuming that the second CAP 18 has a lighter load than the first CAP 16, and the signal strength at the input to the second CAP 18 is sufficient to support the call, the first CAP 16 may initiate a handoff of the wireless communications device 12. This approach works particularly well when the communication coverage is small, such as might be the case in a Local Access Network (LAN) or Personal Access Network (PAN), because the signal from any wireless communication device will be received by multiple CAPs.

In any event, once the first threshold is reached, the soft handoff of the frame selection function may be initiated in step 44. The first CAP 16 forwards the frames it receives from the wireless device 12, along with soft handoff signaling information, to the second CAP 18. The signaling information causes the second CAP 18 to launch a frame selection function to support the call. The first CAP 16 also directs all other CAPs in communication with the wireless device 12 to forward all reverse-link frames transmitted by the wireless device 12 to the second CAP 18. The second CAP 18 then performs frame selection in accordance with CDMA frame selection principles known in the art, but the actual frame selection function remains with the first CAP 16. That is, the first CAP 16 is still responsible for providing the "best" reverse link frames from the various CAPs to the infrastructure 14, as well as sending the forward link frames (i.e., frames intended for the wireless device 12) from the infrastructure 14 to all CAPs that are participating in the call, for transmission thereof to the wireless device 12.

This process continues until the occurrence of a second threshold. This step of the process is indicated at decision diamond 48 in FIG. 4. In the case where the soft handoff of the selection function is based on user movement throughout the wireless coverage region, the second threshold may be a further increase in the pilot signal strength of the wireless device 12 measured at the second CAP 18 relative to that measured at the first CAP 16. In the case where the soft handoff of the selector function is based on the loading on the CAPs, the second threshold may be a further increase in loading at the first CAP 16. In any event, once the second threshold is reached, the second CAP 18 assumes the frame selection function in step 48. In particular, the first CAP 16 informs the infrastructure 14 and all the CAPs participating in the call to complete the handoff. In response to the signaling, the CAPs stop sending reverse link frames from the wireless device 12 to the first CAP 16. The signaling also causes the second CAP 18 to assume the frame selection function by selecting the "best" frames from the various CAPs to be the frames to be provided to the infrastructure 14 as part of the call. The second CAP 18 also sends the forward link frames (i.e., frames intended for the wireless device 12) from the infrastructure 14 to all CAPs that are participating in the call, for transmission thereof to the wireless device 12.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access point, comprising:

a transceiver configured to receive frames of information from a wireless communications device; and a processor configured to communicate with a remote access point, the processor being configured to perform a frame selection function to select between a first frame received from the wireless communications device by the transceiver, and a second frame received from the wireless communications device through the remote access point and provide a selected frame to an infrastructure over an Internet Protocol (IP) connection therebetween, the processor being further configured to initiate a soft handoff of the frame selection function to the remote access point while at least interimly continuing, after the soft handoff of the frame selection function has been initiated, to solely forward to the infrastructure over the IP connection selected frames from the frame selection function and to forward to the remote access point forward link frames that are received from the infrastructure and that are intended for the wireless communications device.

2. The access point of claim 1 wherein the initiation of the soft handoff of the frame selection function to the remote access point occurs in response to a first threshold, and wherein completion of the soft handoff of the frame selection function to the remote access point occurs in response to a second threshold.

3. The access point of claim 2 wherein the processor is further configured to determine the first or second threshold from a signal received from the remote access point, the signal indicating the pilot signal strength from the wireless communications device measured at the remote access point.

4. The access point of claim 2 wherein the processor is further configured to determine the loading on the access point, the processor being further configured to determine the first or second threshold as a function of the loading.

5. The access point of claim 2 wherein the initiation of the soft handoff of the frame selection function comprises enabling a frame selection entity in the remote access point while maintaining the frame selection function at the access point.

6. The access point of claim 5 wherein the initiation of the soft handoff of the frame selection function comprises sending the frames received by the transceiver to the remote access point.

7. The access point of claim 5 wherein the processor includes a frame selection entity to perform the frame selection function, and wherein the processor is further configured to complete the soft handoff of the frame selection function by disabling its frame selection entity.

8. The access point of claim 5 wherein the processor is further configured to complete the soft handoff of the frame selection function by instructing the remote access point to no longer send the frames received from the wireless communications device to the access point.

9. A method of communications, comprising:

receiving frames of information from a wireless communications device;

communicating with a remote access point including performing a frame selection function to select between a first frame received from the wireless communications device and a second frame received from the wireless communications device through the remote access point and providing a selected frame to an infrastructure over an Internet Protocol (IP) connection therebetween; and initiating a soft handoff of the frame selection function to the remote access point while at least interimly continuing, after the soft handoff of the frame selection function has been initiated, to solely forward to the infrastructure over the IP connection selected frames from the frame selection function and to forward to the remote access point forward link frames that are received from the infrastructure and that are intended for the wireless communications device.

10. The method of claim 9, wherein the initiation of the soft handoff of the frame selection function occurs in response to a first threshold, and further comprising:

completing the soft handoff of the frame selection function to the remote access point in response to a second threshold.

11. The method of claim 10, further comprising determining the first or second threshold from a signal received from the remote access point, the signal indicating the pilot signal strength from the wireless communications device measured at the remote access point.

12. The method of claim 10, further comprising:

determining the loading on the access point; and determining the first or second threshold as a function of the loading.

13. The method of claim 10, wherein the initiation of the soft handoff of the frame selection function comprises enabling a frame selection entity in the remote access point while maintaining the frame selection function at the access point.

14. The method of claim 13, wherein the initiation of the soft handoff of the frame selection function comprises sending the frames received by the transceiver to the remote access point.

15. The method of claim 13, wherein a frame selection entity performs the frame selection function, and wherein the method further comprises completing the soft handoff of the frame selection function by disabling its frame selection entity.

16. The method of claim 13, further comprising completing the soft handoff of the frame selection function by instructing the remote access point to no longer send the frames received from the wireless communications device to the access point.

17. An access point, comprising:

means for receiving frames of information from a wireless communications device; and means for communicating with a remote access point including means for performing a frame selection function to select between a first frame received from the wireless communications device and a second frame received from the wireless communications device through the remote access point and means for providing a selected frame to an infrastructure over an Internet Protocol (IP) connection therebetween; and means for initiating a soft handoff of the frame selection function to the remote access point while at least interimly continuing, after the soft handoff of the frame selection function has been initiated, to solely forward to the infrastructure over the IP connection selected frames from the frame selection function and to forward to the remote access point forward link frames that are received from the infrastructure and that are intended for the wireless communications device.

18. The access point of claim 17, wherein the initiation of the soft handoff of the frame selection function occurs in response to a first threshold, and further comprising:

means for completing the soft handoff of the frame selection function to the remote access point in response to a second threshold.

19. The access point of claim 18, further comprising means for determining the first or second threshold from a signal received from the remote access point, the signal indicating the pilot signal strength from the wireless communications device measured at the remote access point.

20. The access point of claim 18, further comprising:

means for determining the loading on the access point; and means for determining the first or second threshold as a function of the loading.

21. The access point of claim 18, wherein the initiation of the soft handoff of the frame selection function comprises enabling a frame selection entity in the remote access point while maintaining the frame selection function at the access point.

22. The access point of claim 21, wherein the initiation of the soft handoff of the frame selection function comprises sending the frames received by the transceiver to the remote access point.

23. The access point of claim 21, wherein a frame selection entity performs the frame selection function, and wherein the access point further comprises means for completing the soft handoff of the frame selection function by disabling its frame selection entity.

24. The access point of claim 21, further comprising means for completing the soft handoff of the frame selection function by instructing the remote access point to no longer send the frames received from the wireless communications device to the access point.

25. A wireless communication device, comprising:

circuitry configured to transmit a first frame of information to a first access point and to transmit a second frame of the information to the first access point through a second access point after initiation of a soft handoff of a frame selection function from the first access point of the plurality of access points to the second access point of the plurality of access points, wherein the first access point continues, after the soft handoff of the frame selection function has been initiated, to solely forward to an infrastructure component selected frames from the frame selection function and to forward to the second access point forward link frames that are received from the infrastructure component and that are intended for the wireless communication device.

26. The wireless communication device of claim 25, wherein the initiation of the soft handoff of the frame selection function occurs in response to a first threshold, and wherein completion of the soft handoff of the frame selection function occurs in response to a second threshold.

27. The wireless communication device of claim 26, wherein the circuitry is further configured to transmit a pilot signal to at least one of the access points, and wherein at least one of the first threshold and the second threshold are determined from a signal indicating a pilot signal strength from the wireless communication device measured at one of the access points.

28. The wireless communication device of claim 26, wherein at least one of the first threshold and the second threshold are determined as a function of loading on at least one of the access points.

29. A non-transitory computer-program product comprising a computer-readable medium having instructions thereon, the instructions comprising:

code for receiving frames of information from a wireless communications device; code for communicating with a remote access point including performing a frame selection function to select between a first frame received from the wireless communications device and a second frame received from the wireless communications device through the remote access point and providing a selected frame to an infrastructure over an Internet Protocol (IP) connection therebetween; and code for initiating a soft handoff of the frame selection function to the remote access point while at least interimly continuing, after the soft handoff of the frame selection function has been initiated, to solely forward to the infrastructure over the IP connection selected frames from the frame selection function and to forward to the remote access point forward link frames that are received from the infrastructure and that are intended for the wireless communications device.

* * * * *